(12) United States Patent
Wu et al.

(10) Patent No.: US 11,353,845 B2
(45) Date of Patent: *Jun. 7, 2022

(54) MODEL-ADAPTIVE MULTI-SOURCE LARGE-SCALE MASK PROJECTION 3D PRINTING SYSTEM

(71) Applicant: BEIJING UNIVERSITY OF TECHNOLOGY, Beijing (CN)

(72) Inventors: Lifang Wu, Beijing (CN); Lidong Zhao, Beijing (CN); Zechao Liu, Beijing (CN); Jiankang Qiu, Beijing (CN); Xiaohua Guo, Beijing (CN); Meng Jian, Beijing (CN); Ziming Zhang, Beijing (CN)

(73) Assignee: Beijing University of Technology, Beijing (CN)

( * ) Notice: Subject to any disclaimer, the term of this patent is extended or adjusted under 35 U.S.C. 154(b) by 142 days.

This patent is subject to a terminal disclaimer.

(21) Appl. No.: 17/002,772

(22) Filed: Aug. 25, 2020

(65) Prior Publication Data

US 2021/0018897 A1  Jan. 21, 2021

Related U.S. Application Data

(63) Continuation-in-part of application No. 16/316,477, filed as application No. PCT/CN2016/106282 on Nov. 17, 2016, now Pat. No. 10,759,110.

(51) Int. Cl.
*G05B 19/4099* (2006.01)
*H04N 9/31* (2006.01)

(52) U.S. Cl.
CPC ....... *G05B 19/4099* (2013.01); *H04N 9/3194* (2013.01); *G05B 2219/49023* (2013.01)

(58) Field of Classification Search
CPC ... B29C 64/129; B29C 64/291; B29C 64/393; G06T 15/00; G06T 15/04; G06T 15/10; G06T 15/50; H04N 1/024; H04N 1/02815
See application file for complete search history.

(56) References Cited

U.S. PATENT DOCUMENTS 6,383,719 B1 * 5/2002 Bula ................. G03F 7/203
430/394
6,416,908 B1 * 7/2002 Klosner ............. G03F 7/703
430/5

(Continued)

FOREIGN PATENT DOCUMENTS

CN  105856568 A  8/2016
CN  106127842 A1  11/2016

(Continued)

OTHER PUBLICATIONS

International Searching Authority—State Intellectual Property Office of the P.R. China, International Search Report for international application No. PCT/CN2016/106282 dated Aug. 18, 2017, (English translation provided).

*Primary Examiner* — Gandhi Thirugnanam
(74) *Attorney, Agent, or Firm* — McDonnell Boehnen Hulbert & Berghoff LLP

(57) ABSTRACT

A model-adaptive multi-source large-scale mask projection 3D printing system configured to conduct the following steps: projecting pure-color images of first and second colors having identical attributes, capturing an image of an overlapping portion and calculating height and width information of the overlapping portion; splitting a pre-processed slice and respectively recording width and height information of two slices resulting from the splitting and generating two gray scale images having identical attributes thereto; counting power values of identical positions of slices in different gray scale values, performing a further calculation (Continued)

to obtain a projection mapping function, using the projection mapping function as a basis for performing optimization on gray scale interpolation of the generated images; and fusing the processed gray scale images and the originally split two slices to obtain a mask projection 3D printing slice having a uniform shaping brightness, and forming a final product.

14 Claims, 5 Drawing Sheets

(56) References Cited

U.S. PATENT DOCUMENTS

| | | | | |
|---|---|---|---|---|
| 6,934,052 | B2* | 8/2005 | Venable | H04N 1/387 358/1.18 |
| 10,759,110 | B2* | 9/2020 | Wu | B29C 64/393 |
| 2004/0159396 | A1* | 8/2004 | Murase | H01L 21/4867 257/E23.061 |
| 2006/0100734 | A1* | 5/2006 | Huang | B33Y 40/00 700/119 |
| 2008/0021586 | A1* | 1/2008 | Schillen | B33Y 30/00 700/120 |
| 2008/0038396 | A1* | 2/2008 | John | G03F 7/0037 425/174.4 |
| 2014/0098092 | A1* | 4/2014 | Isokawa | G06T 15/00 345/419 |
| 2016/0303797 | A1* | 10/2016 | Moran | B29C 64/135 |
| 2019/0291341 | A1* | 9/2019 | Wu | H04N 1/024 |
| 2021/0018897 | A1* | 1/2021 | Wu | H04N 9/3147 |

FOREIGN PATENT DOCUMENTS

| | | |
|---|---|---|
| EP | 3543957 A4 | 1/2020 |
| WO | 2016173100 A1 | 11/2016 |

* cited by examiner $W = W_0 = W_1 = W_2$

MODEL-ADAPTIVE MULTI-SOURCE LARGE-SCALE MASK PROJECTION 3D PRINTING SYSTEM

CROSS-REFERENCE TO RELATED APPLICATION

This application is a continuation-in-part application of U.S. patent application Ser. No. 16/316,477, filed on Jan. 9, 2019 and published as United States Patent Application Publication No. US 2019/0291341 A1 on Sep. 26, 2019. U.S. patent application Ser. No. 16/316,477 is a national stage application under 35 U.S.C. § 371 of International Patent Application No. PCT/CN2016/106282, filed on Nov. 17, 2016. United States Patent Application Publication No. US 2019/0291341 A1 and U.S. patent application Ser. No. 16/316,477 are incorporated herein by reference.

TECHNICAL FIELD

The invention relates to a technology of intelligent control and image processing, and in particular to a system of handling pictures output from projectors. By determining the number of projectors to be used based on model adaptive analysis and optimizing slices based on the number projectors, thereby large scale mask projection 3D printing using multiple projectors and energy homogenization optimization for the large scale mask projection 3D printing using multiple projectors.

BACKGROUND ART 3D printers were born in the mid 1980s, and were first invented by American scientists. A 3D printer is an apparatus that uses 3D printing technology to produce a device of the real object. The basic principle for 3D printing is using special materials (resin or powder, etc.) to manufacture real 3D models that are designed in computer, and by aggradation of the binder, each layer of printing material are bobbed to form the designed shape, and the 3D objects are finally printed out. The rapid prototype manufacturing technology is widely applied in the model manufacture in the stage of product development because of the fast manufacturing and low cost. 3D printing is a kind of rapid prototyping technology. It first transfers the objects into 3D data, and then uses the adhesive materials such as powdered metal, plastic and so on to print them layer by layer. The model manufacturing and industrial design are used to build models. They are now becoming product manufacturing and forming "Direct Digital Manufacturing." A variety of the rapid manufacturing technologies have been developed such as the Stereo Lithography Appearance (SLA), the Laminated Object Manufacturing (LOM), the Fused Deposition Modeling (FDM), the Selective Laser Sintering (SLS), the Three-Dimensional Printing (3DP), and the Digital Light Procession (DLP) etc. However, in the current situation, the accuracy of FDM is poor, and it is necessary to continuously melt the material wire and wait for the material to cure, and the overall forming speed is slow. The SLA technology is limited by the optical characteristics of galvanometers. Generally, the galvanometer-type printing surface is less than 300 mm*300 mm. Area dynamic focusing system is required if the size of the printing area is more than 300 mm*300 mm. and it will greatly raise the cost. The principle of the galvanometer system determines that the larger the printing area, the longer the focal length, and the larger the spot, the more laser energy is wasted. The DLP technology is similar to a projector's principle, in which the most important component is the DMD chip. The biggest advantage of DLP is that it can be exposed layer by layer. Theoretically, it is very fast. However, if a larger printing area is required and the high power density of the curing light is required simultaneously, the light intensity must be greatly increased, but the DMD cannot withstand the high light intensity, and the heat dissipation of the system becomes a serious problem if the light intensity increases. Therefore, 3D printing based on DLP technology developed slowly in the direction of large printing area.

Because the energy radiated from each DLP projector is non-uniform light energy, using multiple projectors will inevitably cause uneven distribution of the illumination intensity on each projector and it will also affect the overlapped area on the printing area, and aggravate the non-uniformity of the energy.

Summary of the Disclosure

An embodiment of the invention provides a large scale mask projection 3D printing system using multiple projectors. Slice processing for mask projection using two projectors will be introduced. Thus, the output energies can be homogenized by adjusting the images of the projectors. Meanwhile, it can easily be extended to larger sizes.

To solve this technical problem, the invention provides a model-adaptive multiple-projector large-scale mask projection 3D printing system which comprises at least two projectors and is configured to conduct the steps of:

Step 100: using the at least two projectors as a light-source for mask projection, and locating the projectors to be adjacent to each other so that there is an overlapped area between the projection areas of the projectors, wherein the two projectors project two images with the same property but with different pure colors, a first color and a second color, and the overlapped area between the projection areas of the projectors has a third color; then, using a camera to capture an image of the projection areas and the overlapped area, and analyzing the image using a computer, wherein the height and width of the overlapped area are denoted as $H_0$ and $W_0$ respectively;

Step 200: determining the number of projectors to be used according to the height $H_0$ and width $W_0$ information of the overlapped region as well as the maximum exposure area of the model, and judging whether the slice needs to be segmented; and in the condition that it needs to be segmented, segmenting the slice into two, the two slices being denoted as $P_1$ and $P_2$ respectively; recording the width $W_1$ and $W_2$ and the $H_1$ and $H_2$ of the two slices $P_1$ and $P_2$; and then generating two corresponding gray leveled pictures $P_3$ and $P_4$ having the same property with the two slices;

Step 300: measuring the output energy at the same position on a printing area with discrete gray levels; by analyzing the measured data, obtaining a mapping function $T[r(x, y)]$ by using curve fitting; and based on the mapping function $T[r(x, y)]$, optimizing the generated pictures $P_3$ and $P_4$ using gray level interpolation;

Step 400: fusing the pictures $P_3$ and $P_4$ treated above with the two slices $P_1$ and $P_2$ to generate a series of 3D printed slices with energy homogenization, and performing system control to form a final printed product.

According to a possible embodiment, Step 100 comprises the substeps of:

testing and adjusting the levelness of the projectors by using a leveler so that the projectors have same projection orientation; then fixing these projectors so that their relative position is invariable;

activating the projectors to project images with different pure colors so that the overlap area between them has the third color which is a mixture of the two pure colors and can be identified by a computer; and using the camera to capture the image of the projection areas, including the areas with the two pure colors and that with the mixed color; obtaining details of the overlapped area based on the differences between image pixels; and recording the height and width of the overlapped area as $H_0$ and $W_0$ respectively.

According to a possible embodiment, Step 200 comprises the substep of:

obtaining all the slices of the model, and obtaining the maximum exposure area $S_{max}$ by performing "OR" calculation to all the slices; in the condition that the scale of the maximum exposure area remains unchanged, zooming the maximum exposure area; obtaining the dimensions of the maximum projection area of each projector by mapping; and then determining the number of projections to be used.

According to a possible embodiment, in the condition that two projections are to be used, Step 200 further comprises the substeps of:

zooming the slices to the size of the printing area with the invariable aspect ratio, and recording the height and width of the whole slice as H and W respectively;

segmenting the slice based on the height $H_0$ and width $W_0$ of the overlapped area, recording the segmented slices as $P_1$ and $P_2$, and recording their widths as $W_1$ and $W_2$ and their heights as $H_1$ and $H_2$; and generating two gray leveled images $P_3$ and $P_4$ with the same gray levels attributes with $P_1$ and $P_2$ based on the widths and heights of the two segmented slices $P_1$ and $P_2$.

In Step 200, for a model including different maximum exposure area, the number of the projectors to be used, which are arranged in arrays, can be determined by adaptive calculating.

According to a possible embodiment, in Step 300:

for the power value at the same position with different gray levels, the complete projection mapping function is obtained through Fourier series curve fitting:

$$T[r(x, y)] = a_0 + a_1 * \cos(r(x,y)*w) + b_1 * \sin(r(x, y)*w)$$

wherein r(x, y) is the gray level at location (x, y), w is angular frequency, and $a_0$ and $a_1$ are constants.

According to a possible embodiment, according to the relationship of the overlapped area and projection mapping function of gray leveled images $P_3$, $P_4$, the illumination energy in the printing area of the gray leveled images $P_3$, $P_4$ are determined based on the following energy homogenization formula:

$$(r_1, r_2)(x, y) = \mathrm{argmin}\left(\sum_{(x,y) \in PS_{max}} |f(T_1(r_1(x, y)), T_2(r_2(x, y))) - \bar{f}| - \right.$$
$$\left. \bar{f} + sm(r_1(x, y)) + sm(r_2(x, y))\right)$$

wherein f ($T_i$, $T_2$) is a function defining the arrangement of the projections, section $S_1$ is defined as an area that belongs to gray image $P_3$ without overlapped with $P_4$, section $S_2$ is defined as an area that belongs to gray images $P_4$ without overlapped with $P_3$, section $S_3$ is defined as the overlapped area between gray images $P_3$ and $P_4$, and $S_{max}$ is the maximum exposure area, then $$f(T_1, T_2) = \begin{cases} T_1[r_1(x, y)], & (x, y) \in S_1 \\ T_2[r_2(x, y)], & (x, y) \in S_2 \\ T_1[r_1(x, y)] + T_2[r_2(x, y)], & (x, y) \in S_3 \end{cases}$$

the optimized output power for the whole output plane of a single light source f being represented by:

$$\bar{f} = \frac{1}{N_{S_{max}}} \sum_{(x,y) \in PS_{max}} f(T_1(I_1(x, y)), T_2(I_2(x, y)))$$

a restriction factor sm(r(x, y)) for guaranteeing smooth transition of gray level of the picture being defined as:

$$sm(r(x, y)) = \sum_{(x,y) \in PS_{max}} \left(\left|\frac{dr(x, y)}{dx}\right| + \left|\frac{dr(x, y)}{dy}\right|\right)$$

According to a possible embodiment, for the energy homogenization formula, illumination unevenness of the exposure areas in sections $S_1$, $S_2$ and $S_3$ is reduced in the following way:

1) dividing sections $S_1$, $S_2$ and $S_3$ into M×N image sub-blocks respectively; for sections $S_1$ and $S_2$, using areas in the slice image as exposable areas; finding corresponding energy values from the obtained sub-areas of the image of the candidate area for exposure area; and selecting the minimum energy value as the optimal target energy value in the exposure area;

2) obtaining the illumination energy corresponding to the gray value of each pixel at the boundary of sections $S_1$ and $S_3$, and storing it in an array "A"; obtaining the illumination energy corresponding to the gray value of each pixel of the boundary of sections $S_2$ and $S_3$, and storing it in an array "B"; establishing two linear equations reflecting the change in the height or width in sections $S_3$; and determining the energy value of each position in section $S_3$ based on the combination of the energy values of the two linear equations at the same position.

According to a possible embodiment, after the energy value of each position in the third section $S_3$ is determined, linear interpolation is performed in sections $S_1$ and $S_2$ respectively so that two gray level images with smooth gray changes are obtained.

According to a possible embodiment, in Step 400:

the gray value of each pixel in the interpolated gray level image is sequentially scanned; the next pixel is skipped if the gray level value is zero; if the gray value is greater than zero, the gray value of the pixel is obtained, and then the gray value is assigned to the same pixel position of the original image slice; and finally, the pixels of the segmented slices $P_1$ and $P_2$ are distributed in gray levels to satisfy the pixel gray distribution of the gray images $P_3$ and $P_4$, respectively.

According to a possible embodiment, once an image slice has been exposed, the projectors undergo a blank screen time during which mechanical components of the 3D printing system are moved into their next positions for the next operation of the projectors; wherein the projections are repeated until a desired 3D printed product is formed; and wherein the blank screen time is determined based on the thickness of the slice and the movement time of the mechanical components of the 3D printing system.

According to a possible embodiment, by using a plurality of projectors of the same energy distribution as light sources of the mask projection 3D printer, Steps 100 to 400 and the corresponding sub-steps are performed for every two projectors adjacent in the height direction or/and in the width direction.

According to a possible embodiment, in Step 200, for a model including different maximum exposure area, the number of the projectors to be used, which are arranged in arrays, is determined by adaptive calculating.

In an embodiment in which a plurality of projectors of the same energy distribution as light sources of the mask projection 3D printer, for the energy values of the projected gray level images in the same position in different gray levels values, a complete projection mapping function is obtained through Fourier series curve fitting:

$$T[r(x, y)] = a_0 + a_1 * \cos(r*w) + b_1 * \sin(r*w)$$

wherein $r(x, y)$ is a gray image at location $(x, y)$, w is the angular frequency, and $a_0$ and $a_1$ are constants.

In an embodiment in which a plurality of projectors of the same energy distribution as light sources of the mask projection 3D printer, the illumination power in the exposable areas of each slice is determined according to the relationship of the intersection positions of the slices and the projection mapping function and based on the following light power formula:

$$\begin{cases} r'(x, y) = \mathrm{argmin}\left( \sum_{(x,y) \in PS_{max}} \left| f\left(\sum_{i=1}^{n} T_n[r'_n(x, y)]\right) - \overline{f} \right| - \overline{f} + \sum_{i=1}^{n} sm(r'(x, y)) \right) \\ f\left(\sum_{i=1}^{n} T_n[r'_n(x, y)]\right) = \begin{cases} T_n[r'_n(x, y)], & (x, y) \in S_n \\ \sum_{i=1}^{n} T_n[r'_n(x, y)], & (x, y) \in S_3 \end{cases} \\ \overline{f} = \frac{1}{N_{S_{max}}} \sum_{(x,y) \in PS_{max}} f\left(\sum_{i=1}^{n} T_n[r'_n(x, y)]\right) \\ sm(r'(x, y)) = \sum_{(x,y) \in PS_{max}} \left( \left|\frac{dr'(x, y)}{dx}\right| + \left|\frac{dr'(x, y)}{dy}\right| \right) \end{cases}$$

wherein $f(T_1, T_2)$ denotes the arrangement of the projections, $S_n$ denotes the portion of each projector that does not overlap with other projectors, $S_m$ denotes the overlap between the projectors, as the number of projectors is multiplied, f denotes the optimized output power for the whole output plane of a single light source, and $sm(r(x, y))$ denotes a restriction factor for guaranteeing smooth transition of gray level of the picture.

The features of other aspects in the embodiment using more than two projectors as mask projection 3D printer's light sources are similar to those in the embodiment using two projectors as mask projection 3D printer's light sources.

The energy homogenization process that performed by the large scale mask projection 3D printing system of the invention provides the following advantages:

1) Improve the scale of exposure area.
2) Portability—when the projection mapping function of different light sources is acquired, the process can be easily transplanted.
3) Printability—this energy homogenization process performed by the multi-source large-scale mask projection 3D printing system can be applied in most conditions where optimization is not necessary. It has strong applicability and high success rate of one-time printing. Therefore, the present invention has a certain application value and significance.

DETAILED DESCRIPTION OF PREFERRED EMBODIMENTS

Some embodiments of the disclosure will be described with reference to the drawings. It should be noted that, various embodiments and various features of the embodiments of the disclosure can be implemented in combination in the condition that no confliction is caused.

The invention provides a model adaptive large-scale mask projection 3D printing system which comprises multiple projectors and in which an energy homogenization process can be performed. The 3D printing system further comprises mechanical components for moving at least the projectors to their determined working positions. By dealing with each slice, the interference is reduced and large-area exposure is achieved. The large area mentioned is determined by the number of specific projections, i.e., the width and height are considered to be at least 280 mm×280 mm.

Figure 1:
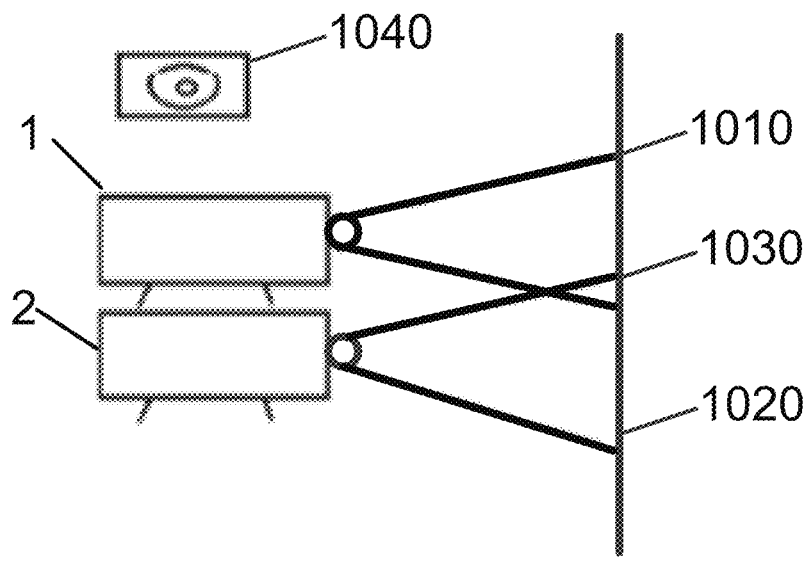
FIG. 1 is a schematic diagram of a part of a large scale mask projection 3D printing system according to an embodiment of the invention, the system comprising two projectors as example.

The mask projection 3D printer mainly uses a digital light processing (DLP) projector as a light source, and the most important component in the projector is a digital micro-mirror device (DMD) to complete the visual digital information display technology. Specifically, DLP projection technology uses DMD chips as the primary key processing element to implement digital optical processing. However, if a larger surface is required and the high power density of the curing light is to be satisfied at the same time, the light intensity must be greatly increased. But DMD does not withstand the high light intensity. At the same time, the light intensity increases, the system cooling problem is serious. Therefore, the current 3D printing based on DLP technology is developing slowly in the processing format. Therefore, we have designed an algorithm for large-area mask projection printing in which multiple projectors as the light sources of mask projection 3D printer are used for exposure, which solves the problem of splicing between slices that are projected by each projector. FIG. 1 is a schematic diagram of a part of 3D printing system according to an embodiment of the invention, which includes two projectors 1 and 2, for example. This schematic diagram uses two projectors 1 and 2 as examples. Wherein, the upper slice 1010 is projected by the upper projector, the lower slice 1020 is projected by the lower projector, the overlapping portion 1030 is located in the overlapped area, and the camera is 1040.

Here, it should be pointed out that, for the convenience of description, in the example shown in the figure, two projectors 1, 2 are stacked one above the other to produce an upper slice, a lower slice, and an overlapped area between them. It is understood that the principle of the present invention is also applicable to the case where two projectors are overlapped on the left and right sides to generate a left half of the slice, a right half of the slice, and an overlapped area between them. It will also be understood that the principles of the present invention are also applicable to multiple projector combinations. For a large width and height, it may be necessary to put two or more projectors in the width and height directions together to implement the mosaic effect of the multi-source exposure surface. The projectors are preferably arranged in a matrix, and there are overlapped areas between the adjacent slices (left and right) (i.e., in the widthwise direction) and the adjacent slices (up and down) (i.e., in the height direction).

The drawings are used to explain the basic principle of the present invention. It is described for the examples of two projectors placed side by side in the figures. It can be understood that the described features are also applicable to projectors arranged in other ways or other numbers of projectors.

Figure 2:
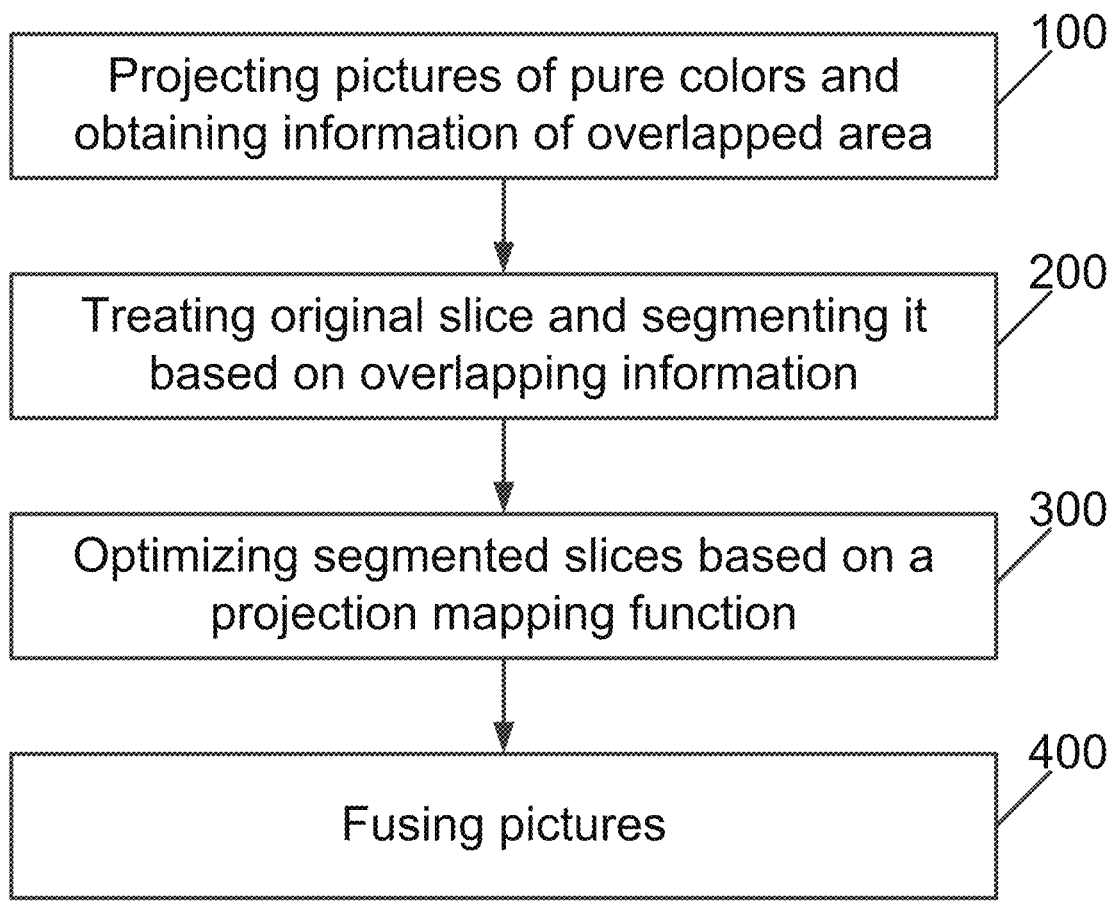
FIG. 2 is a flow chart of an energy homogenization process that can be conducted by the 3D printing system of the invention.

FIG. 2 is a flow chart of an energy homogenization process that can be conducted by the model adaptive large-scale mask projection 3D printing system shown in FIG. 1.

The model adaptive large-scale mask projection 3D printing system of invention can conduct the steps described below.

Step 100: Ensure that two projectors of the same specification are placed side by side under the condition of just full contact. Two projectors output images with red and green respectively. The upper image is red and the down image is green. And the overlapped region is the yellow. Using a camera to capture the image of the projection area and the overlapped area could be obtained by analyzing the image using computer, the height and width of the overlapped areas are denoted as $H_0$ and $W_0$ respectively.

Step 200: Determining the number of projectors to be used according to the height $H_0$ and width $W_0$ information of the overlapped region as well as the maximum exposure area of the model, and judging whether the slice needs to be segmented; and in the condition that it needs to be segmented, segmenting the slice into two, the two slices being denoted as $P_1$ and $P_2$; meanwhile, the width and height of the $P_1$ and $P_2$ being denoted as $W_1$ and $W_2$, $H_1$ and $H_2$ respectively; then two gray leveled images $P_3$ and $P_4$ being generated with the same properties of $P_1$ and $P_2$.

Step 300: Measuring the output energy at the same position with some discrete gray levels. By analyzing the statistic data, the mapping function $T[r(x, y)]$ is acquired by using curve fitting. Based on the mapping function $T[r(x, y)]$, the power value of gray leveled pictures at the same position with different gray levels is calculated. The generated pictures $P_3$ and $P_4$ are optimized based on the projection mapping functions.

Step 400: When pictures $P_3$ and $P_4$ have been completed, fusing $P_3$ (and $P_4$) with $P_1$ and ($P_2$), so the slices with energy homogenization are generated, and performing system control to form a final printed product.

Preferably, the processing Step 100 includes:

Substep 110: The levelness of projector 1 and projector 2 is tested by using the leveler, so that the projectors have same projection orientation. The projector 1 and projector 2 are fixed so that their relative position is invariable.

Substep 120: Let the two projectors 1 and 2 respectively project red and green pure color images. Because the two projectors are placed in a stack, the projection areas must overlap, allowing one projector to project a red image and one to project a green image. This ensures that the overlapping area is yellow and is easily recognized by the computer. Making these projectors project a different pure color image and try to make the overlapped area easily to identify.

Substep 130: Using a camera to capture the image of the projection area including the areas with two pure colors and the mixed color. Based on the differences between image pixels, the details of the overlapped area are easily obtained. The height and width of the overlapped area are denoted as $H_0$ and $W_0$ respectively.

Further, Step 200 includes:

Substep 210: Obtaining all the slices of the model, and obtaining the maximum exposure area S. by performing "OR" calculation to all the slices; in the condition that the scale of the maximum exposure area remains unchanged, zooming the maximum exposure area; obtaining the dimensions of the maximum projection area of each projector by mapping; and then determining the number of projections to be used (two projections are used as example in the substeps below).

Substep 220: Zooming the slices to the size of the printing area with the invariable aspect ratio. In addition, the exposed parts of the slices should have same size of projectors' project image. And record the whole slice's height as H, and the width is W.

Substep 230: According to the height $H_0$ and width $W_0$ of the overlapped area, the slices will be segmented using the following formula. And the segmented slices are denoted as $P_1$ and $P_2$. Their widths are $W_1$ and $W_2$, and heights are $H_1$ and $H_2$:

$$H_1 = H_2 = H/2 + H_0 \tag{1}$$

$$W = W_0 = W_1 = W_2 \tag{2}$$

Figure 3A:
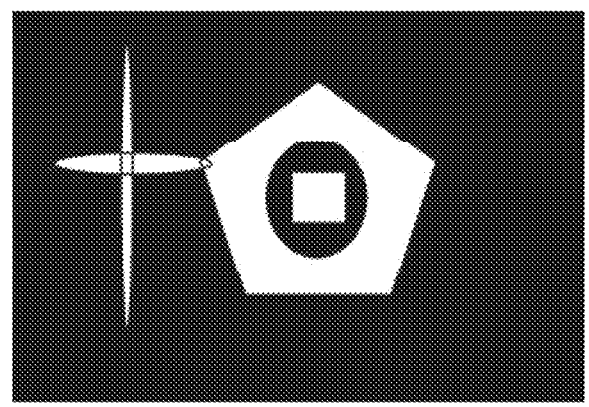
FIG. 3A shows the original slice.
Figure 3B:
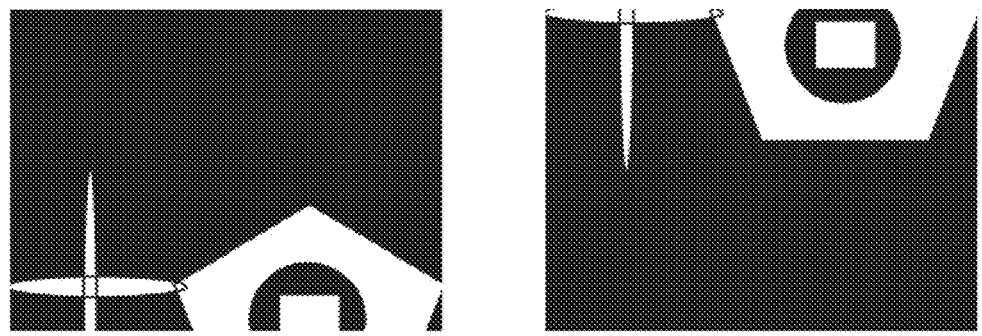
FIG. 3B shows the upper and lower parts of the slices after segmentation.
Figure 4:
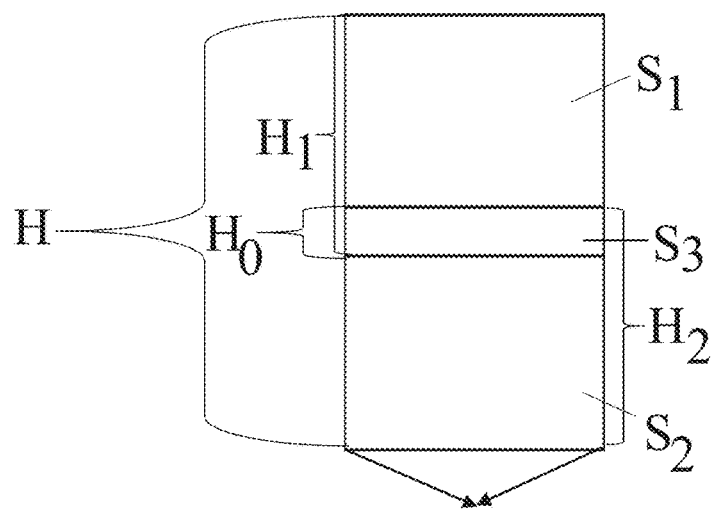
FIG. 4 is an illustration of labeling information in the projection image.

Among them, FIG. 3A shows the original slice, and FIG. 3B shows the upper and lower parts of the slices after segmentation, and FIG. 4 is illustration of labeling information in the projection image.

Substep 240: According to the width and height of $P_1$ and $P_2$ in the two sections after segmentation, two gray leveled images $P_3$ and $P_4$ are generated with the same gray levels attributes of $P_1$ and $P_2$.

Figure 5:
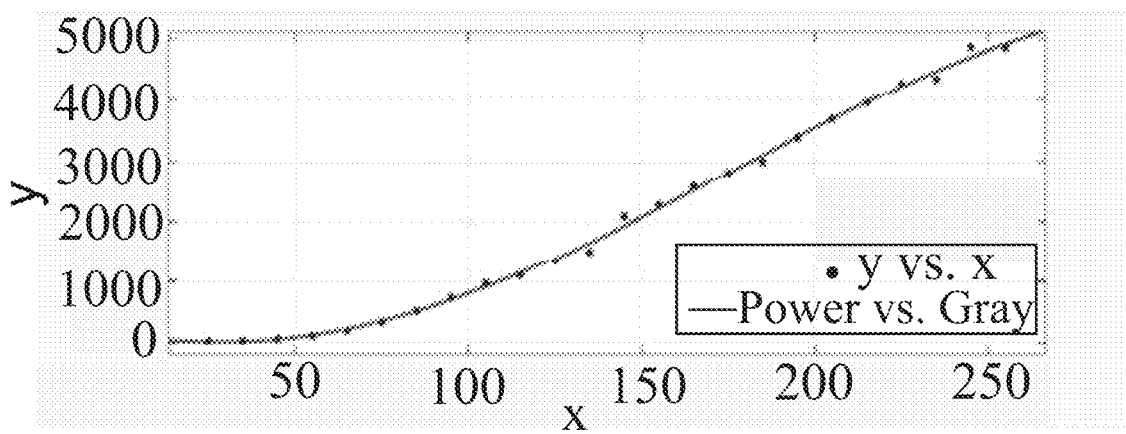
FIG. 5 is an illustration of the projection mapping function curve fitting.

Further, Step 300 includes:

Substep 310: Measuring the output energy at the same position with some discrete gray levels and find that the energy distribution of the projector is similar at different gray levels at the same position, after further fitting experiments, it was found that the power is non-linearly changing and the law conforms to the Fourier series fitting distribution. The confidence interval is 95%. A complete projection mapping function can be obtained by curve fitting:

$$T[r(x, y)] = a_0 + a_1 * \cos(r*w) + b_1 * \sin(r*w) \quad (3)$$

where r(x, y) is the corresponding brightness of the picture at different positions. FIG. 5 is illustration of the projection mapping function curve fitting. In the above equation, the r represents the gray levels, the w represents the angular frequency, and both the $a_0$ and the $a_1$ represent constants.

Substep 320: According to the relationship between the intersecting positions of the pictures $P_3$ and $P_4$ and the projection mapping function, the expression of the problem shown in the following formula can be obtained. To solve the problem of uneven distribution of illumination energy in the exposable areas (including overlapping areas) of the pictures $P_3$ and $P_4$, the following function is used:

$$(r_1, r_2)(x, y) = \operatorname{argmin}\left(\sum_{(x,y) \in PS_{max}} |f(T_1(r_1(x, y)), T_2(r_2(x, y))) - \bar{f}| - \bar{f} + sm(r_1(x, y)) + sm(r_2(x, y))\right) \quad (4)$$

where $f(T_1, T_2)$ is a function defining the arrangement of the projections. Further, the portion that belongs to the picture $P_3$ and does not intersect with the picture $P_4$ is the first portion $S_1$, the portion that belongs to the picture $P_4$ and does not intersect with the picture $P_3$ is the second portion $S_2$, and the portion that overlaps with the pictures $P_3$ and $P_4$ is the overlapping portion $S_3$, and $S_{max}$ is the maximum exposure area as follows:

$$f(T_1, T_2) = \begin{cases} T_1[r_1(x, y)], & (x, y) \in S_1 \\ T_2[r_2(x, y)], & (x, y) \in S_2 \\ T_1[r_1(x, y)] + T_2[r_2(x, y)], & (x, y) \in S_3 \end{cases} \quad (5)$$

Then, the optimized output power for the whole output plane of a single light source $\bar{f}$ can be represented by:

$$\bar{f} = \frac{1}{N_{S_{max}}} \sum_{(x,y) \in PS_{max}} f(T_1(I_1(x, y)), T_2(I_2(x, y))) \quad (6)$$

A restriction factor sm(r(x, y)) for guaranteeing smooth transition of gray level of the picture is defined as:

$$sm(r(x, y)) = \sum_{(x,y) \in PS_{max}} \left(\left|\frac{dr(x, y)}{dx}\right| + \left|\frac{dr(x, y)}{dy}\right|\right) \quad (7)$$

When the number of light sources involved is n (greater than two), the expression of the problem can also be written as follows:

$$\begin{cases} r'(x, y) = \operatorname{argmin}\left(\sum_{(x,y) \in PS_{max}} \left|f\left(\sum_{i=1}^{n} T_n[r'_n(x, y)]\right) - \bar{f}\right| - \bar{f} + \sum_{i=1}^{n} sm(r'(x, y))\right) \\ f\left(\sum_{i=1}^{n} T_n[r'_n(x, y)]\right) = \begin{cases} T_n[r'_n(x, y)], & (x, y) \in S_n \\ \sum_{i=1}^{n} T_n[r'_n(x, y)], & (x, y) \in S_3 \end{cases} \\ \bar{f} = \frac{1}{N_{S_{max}}} \sum_{(x,y) \in PS_{max}} f\left(\sum_{i=1}^{n} T_n[r'_n(x, y)]\right) \\ sm(r'(x, y)) = \sum_{(x,y) \in PS_{max}} \left(\left|\frac{dr'(x, y)}{dx}\right| + \left|\frac{dr'(x, y)}{dy}\right|\right) \end{cases} \quad (8)$$

where f denotes the arrangement of the projections, $S_n$ denotes the portion of each projector that does not overlap with other projectors, $S_m$ denotes the overlap between the projectors, as the number of projectors is multiplied, f denotes the optimized output power for the whole output plane of a single light source, and sm(r(x, y)) denotes a restriction factor for guaranteeing smooth transition of gray level of the picture. Substep 330: In order to solve the problem of unequal illumination in the exposable area of each section $S_1$, $S_2$, and $S_3$, in formula 4, we use the following method to meet the requirements of the above formula to solve the problem:

1) Sections $S_1$, $S_2$, and $S_3$ are divided into M×N image sub-blocks respectively. For sections $S_1$ and $S_2$, the areas in the slice image are used as exposable areas. Finding the corresponding energy from the obtained sub-areas of the image of the candidate area for exposure area. and the minimum energy is selected as the optimal target energy in the exposure area;

2) Get the lower boundary of the first part $S_1$ (that is, the boundary that falls in the second part $S_2$). The illumination energy corresponding to the gray value of each pixel is stored in the array A. Obtain the upper boundary of the second portion $S_2$ (that is, the boundary that falls in the first portion $S_1$). The illumination energy corresponding to the gray value of each pixel is stored in the array B. When $W_1 = W_2$, two linear equations with the slopes of $K_1$ and $K_2$ with the height change in the overlap area $S_3$ as independent variables are respectively established, where $K_1$ and $K_2$ are respectively represented as:

$$K_1 = a[W_1]/(H_1 - H_0) \quad (9)$$

$$K_2 = b[W_2]/(H_0 - H_2) \quad (10)$$

According to the superposition of the power values of these two linear equations at the same position, it is the power value of each position in the overlapping portion $S_3$ area.

It is understood that for the case where two projectors are placed side by side in the width direction, a linear equation with two slopes can be separately established with the variation of the width in the area of the overlapping portion $S_3$ as an independent variable.

For the case where the number of light sources is larger than two projectors, the overlapping portion $S_3$ may be a superposition of projection images of three or even four projectors. In this regard, linear equations with three or four slopes can be established for the variation of height and width in the area of overlap $S_3$ as independent variables, respectively, then, based on the superposition of the energy values of the three or four linear equations at the same position, the energy value at each position of the overlapping portion $S_3$ is obtained.

Figure 6:
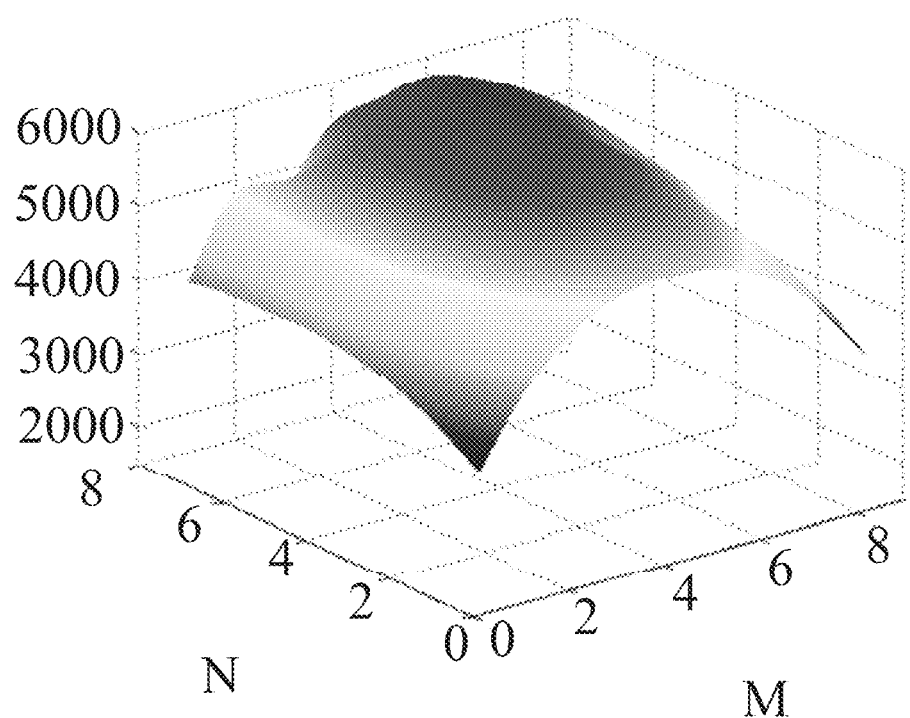
FIG. 6 shows the energy distribution of a projector for the image gray level of 255.
Figure 7A:
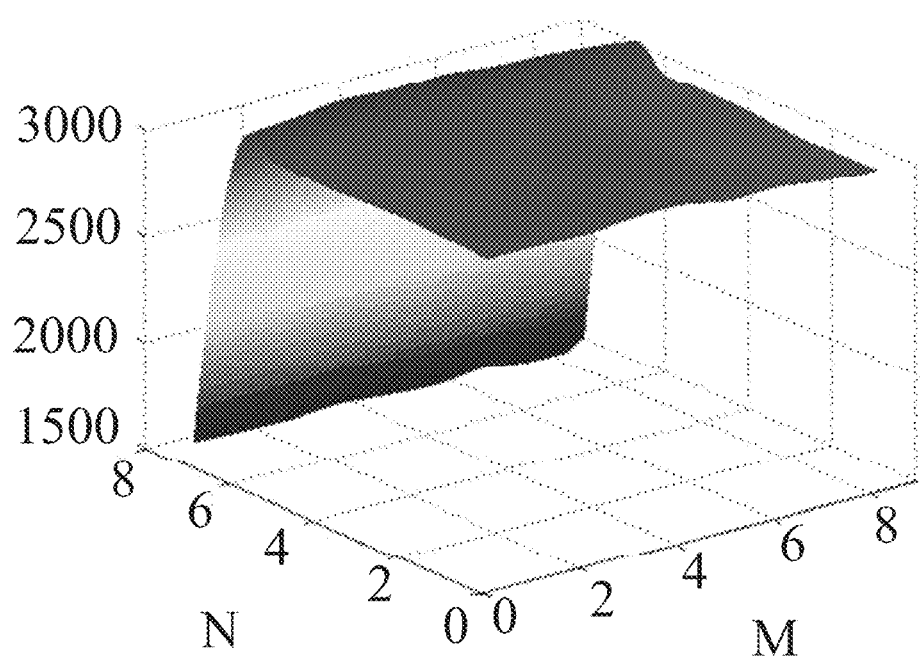
FIG. 7A and FIG. 7B respectively show the distribution of energy of the upper and lower slice images after the energy homogenization process has been conducted.
Figure 7B:
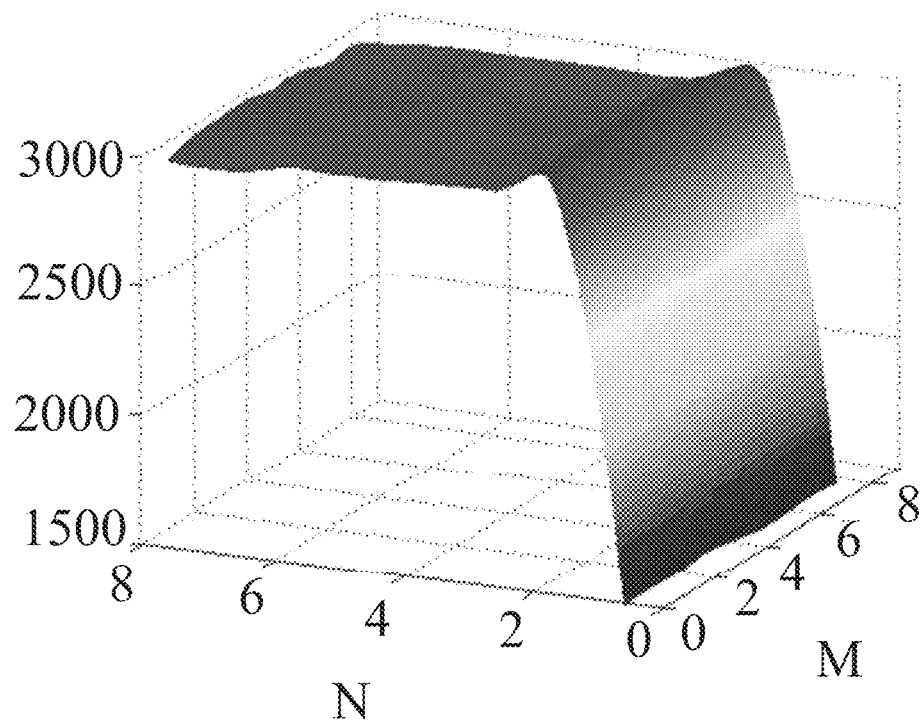

Substep 340: Linear interpolation the two gray leveled images that have been generated, then the two gray leveled pictures with smooth gray changes can be obtained. FIG. 6 shows the projection energy irradiance distribution of the projector when the gray level of the image is 255. FIG. 7A and FIG. 7B respectively show the distribution of energy of the upper and lower slice images after the process is performed.

Figure 8:
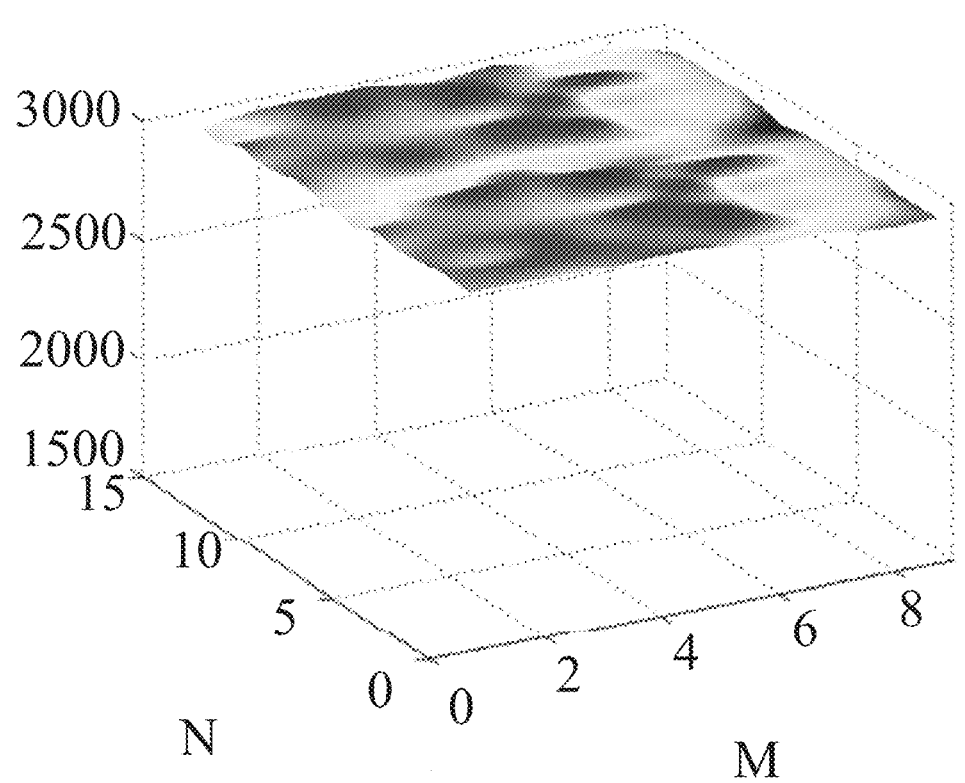
FIG. 8 shows the distribution of energy in the whole slice region after the energy homogenization process has been conducted.

Step 400 includes:

Substep 410: Sequentially scans the gray value of each pixel in the interpolated gray level image and skips the next pixel if the gray level value is zero. If the gray value is greater than zero, obtain the gray value of the pixel, then the gray value is assigned to the same pixel position of the original image slice. Finally the pixels of the segmented slices $P_1$ and $P_2$ are distributed in gray levels to satisfy the pixel gray distribution of the gray images $P_3$ and $P_4$, respectively. FIG. 8 shows the distribution of energy in the whole slice region after the process is performed.

Substep 420: Using DLP projectors to sequentially project image slices obtained in Substep 410. Once an image slice has been exposed, the projectors undergo a blank screen time during which the mechanical components of the 3D printing system are moved into their next positions for the next operation of the projectors. The projections are repeated, until a desired 3D printed product is formed.

The blank screen time is determined based on the thickness of the slice and the movement time of the mechanical components of the 3D printing system.

In the example described above, two projectors respectively project red and green pictures. However, it can be understood that the present invention is applicable in a more general sense to an image projected by an adjacent projector having a first color (pure color) and a second color (pure color) different from the first color. The first color and the second color have a significant color difference (for example, two of the three primary colors are used), but the attributes are the same, and the color of the overlapping area between the two is a third color that is different from the first and second colors.

Here, the picture attributes of the first color and the second color are the same, meaning that their size information and resolution information are the same.

In addition, examples of two projectors placed side by side above and below are described above, and the present invention is not limited to the specific examples and details described, instead, after modifying the previously described details, it can be applied to situations where projectors or other numbers of projectors are arranged in other ways according to the maximum exposure area of the model.

The energy homogenization process that can be performed by the model adaptive multi-source large-scale mask projection 3D printing system of the invention has the following advantages:

1) Improve the scale of exposure area.

2) Portability—when the projection mapping function of different light sources is acquired, the process can be easily transplanted;

3) Printability—this energy homogenization process can be applied in most conditions where optimization is not necessary. It has strong applicability and high success rate of one-time printing. Therefore, the present invention has a certain application value and significance.

The invention claimed is:

1. A model-adaptive multiple-projector large-scale mask projection 3D printing system comprising at least two projectors and configured to conduct the steps of:

Step 100: using the at least two projectors as a light-source for mask projection, and locating the projectors to be adjacent to each other so that there is an overlapped area between projection areas of the projectors, wherein the two projectors project two images with a same property but with different pure colors, a first color and a second color, and the overlapped area between the projection areas of the projectors has a third color; then, using a camera to capture an image of the projection areas and the overlapped area, and analyzing the image using a computer, wherein a height and width of the overlapped area are denoted as $H_0$ and $W_0$ respectively;

Step 200: determining a number of projectors to be used according to the height $H_0$ and width $W_0$ of the overlapped area as well as a maximum exposure area of a model, and judging whether a slice needs to be segmented; and in a condition that it needs to be segmented, segmenting the slice into two slices, the two slices being denoted as $P_1$ and $P_2$ respectively; recording a width $W_1$ and $W_2$ and a height $H_1$ and $H_2$ of the two slices $P_1$ and $P_2$; and then generating two corresponding gray leveled pictures $P_3$ and $P_4$ having the same property with the two slices;

Step 300: measuring an output energy at a same position on a printing area with discrete gray levels; by analyzing the measured output energy, obtaining a mapping function $T[r(x, y)]$ by using curve fitting; and based on the mapping function $T[r(x, y)]$, optimizing the generated pictures $P_3$ and $P_4$ using gray level interpolation; and Step 400: fusing the pictures $P_3$ and $P_4$ treated above with the two slices $P_1$ and $P_2$ to generate a series of 3D printed slices with energy homogenization, and performing system control to form a final printed product.

2. The 3D printing system of claim 1, wherein Step 100 comprises substeps of:

testing and adjusting a levelness of the projectors by using a leveler so that the projectors have a same projection orientation; then fixing these projectors so that their relative position is invariable;

activating the projectors to project images with different pure colors so that the overlap area between them has the third color which is a mixture of two pure colors and can be identified by the computer; and using the camera to capture the image of the projection areas, including the areas with the two pure colors and that with the mixture of two pure colors; obtaining details of the overlapped area based on differences between image pixels; and recording the height and width of the overlapped area as $H_0$ and $W_0$ respectively.

3. The 3D printing system of claim 1, wherein Step 200 comprises a substep of:
   obtaining all slices of the model, and obtaining the maximum exposure area $S_{max}$ by performing "OR" calculation to all the slices; in the condition that a scale of the maximum exposure area remains unchanged, zooming the maximum exposure area; obtaining dimensions of a maximum projection area of each projector by mapping; and then determining the number of projectors to be used.

4. The 3D printing system of claim 1, wherein in a condition that two projections are to be used, Step 200 further comprises substeps of:
   zooming the slices to a size of the printing area with an invariable aspect ratio, and recording the height and width of the whole slice as H and W respectively;
   segmenting a slice based on the height $H_0$ and width $W_0$ of the overlapped area, recording the segmented slices as $P_1$ and $P_2$, and recording their widths as $W_1$ and $W_2$ and their heights as $H_1$ and $H_2$; and
   generating two gray leveled images $P_3$ and $P_4$ with the same gray levels attributes with $P_1$ and $P_2$ based on the widths and heights of the two segmented slices $P_1$ and $P_2$.

5. The 3D printing system of claim 1, wherein in Step 300:
   for a power value at the same position with different gray levels, a complete projection mapping function is obtained through Fourier series curve fitting:

$$T[r(x, y)] = a_0 + a_1 * \cos(r(x, y)*w) + b_1 * \sin(r(x, y)*w)$$

wherein $r(x, y)$ is a gray level at location $(x, y)$, $w$ is an angular frequency, and $a_0$ and $a_1$ are constants.

6. The 3D printing system of claim 5, wherein according to a relationship of the overlapped area and projection mapping function of gray leveled images $P_3$, $P_4$, illumination energy in the printing area of the gray leveled images $P_3$, $P_4$ are determined based on the following energy homogenization formula:

$$(r_1, r_2)(x, y) = \operatorname{argmin}\left( \sum_{(x,y) \in PS_{max}} |f(T_1(r_1(x, y)), T_2(r_2(x, y))) - \bar{f}| - \bar{f} + sm(r_1(x, y)) + sm(r_2(x, y)) \right)$$

wherein $f(T_1, T_2)$ is a function defining an arrangement of the projections, section $S_1$ is defined as an area that belongs to gray image $P_3$ without overlapped with $P_4$, section $S_2$ is defined as an area that belongs to gray images $P_4$ without overlapped with $P_3$, section $S_3$ is defined as the overlapped area between gray images $P_3$ and $P_4$, and $S_{max}$ is the maximum exposure area, then $$f(T_1, T_2) = \begin{cases} T_1[r_1(x, y)], & (x, y) \in S_1 \\ T_2[r_2(x, y)], & (x, y) \in S_2 \\ T_1[r_1(x, y)] + T_2[r_2(x, y)], & (x, y) \in S_3 \end{cases}$$

an optimized output power for the whole output plane of a single light source $\bar{T}$ being represented by:

$$\bar{f} = \frac{1}{N_{S_{max}}} \sum_{(x,y) \in PS_{max}} f(T_1(I_1(x, y)), T_2(I_2(x, y)))$$

a restriction factor $sm(r(x, y))$ for guaranteeing smooth transition of gray level of the picture being defined as:

$$sm(r(x, y)) = \sum_{(x,y) \in PS_{max}} \left( \left| \frac{dr(x, y)}{dx} \right| + \left| \frac{dr(x, y)}{dy} \right| \right)$$

7. The 3D printing system of claim 6, wherein for the energy homogenization formula, illumination unevenness of the exposure areas in sections $S_1$, $S_2$ and $S_3$ is reduced in the following way:
   1) dividing sections $S_1$, $S_2$ and $S_3$ into M×N image sub-blocks respectively; for sections $S_1$ and $S_2$, using areas in a slice image as exposable areas; finding corresponding energy values from the image sub-blocks of a candidate area for exposure area; and selecting a minimum energy value as an optimal target energy value in the exposure area;
   2) obtaining an illumination energy corresponding to a gray level value of each pixel at a boundary of sections $S_1$ and $S_3$, and storing it in an array "A"; obtaining the illumination energy corresponding to a gray level value of each pixel of a boundary of sections $S_2$ and $S_3$, and storing it in an array "B"; establishing two linear equations reflecting a change in the height or width in sections $S_3$; and determining an energy value of each position in section $S_3$ based on a combination of the energy values of the two linear equations at the same position.

8. The 3D printing system of claim 7, wherein after the energy value of each position in a third section $S_3$ is determined, linear interpolation is performed in sections $S_1$ and $S_2$ respectively so that two gray level images with smooth gray changes are obtained.

9. The 3D printing system of claim 8, wherein in Step 400:
   the gray level value of each pixel in an interpolated gray level image is sequentially scanned; a next pixel is skipped if the gray level value is zero; if the gray level value is greater than zero, the gray level value of the pixel is obtained, and then the gray level value is assigned to a same pixel position of the original image slice; and finally, the pixels of the segmented slices $P_1$ and $P_2$ are distributed in gray levels to satisfy a pixel gray distribution of the gray images $P_3$ and $P_4$, respectively.

10. The 3D printing system of claim 9, wherein once an image slice has been exposed, the projectors undergo a blank screen time during which mechanical components of the 3D printing system are moved into their next positions for the next operation of the projectors;
   wherein the projections are repeated until a desired 3D printed product is formed; and
   wherein the blank screen time is determined based on a thickness of the slice and a movement time of the mechanical components of the 3D printing system.

11. The 3D printing system of claim 10, wherein in Step 200, for a model including different maximum exposure area, the number of the projectors to be used, which are arranged in arrays, is determined by adaptive calculating.

12. The 3D printing system of claim 1, wherein by using a plurality of projectors of the same energy distribution as light sources of the mask projection 3D printing system, Steps 100 to 400 and corresponding substeps are performed for every two projectors adjacent in a height direction or/and in a width direction.

13. The 3D printing system of claim 12, wherein in Step 300, for the energy values of the projected gray level images in the same position in different gray levels values, a complete projection mapping function is obtained through Fourier series curve fitting:

$$T[r(x, y)] = a_0 + a_1 * \cos(r*w) + b_1 * \sin(r*w)$$

wherein $r(x, y)$ is a gray image at location $(x, y)$, $w$ is an angular frequency, and $a_0$ and $a_1$ are constants.

14. The 3D printing system of claim 13, wherein an illumination power in exposable areas of each slice is determined according to a relationship of intersection positions of the slices and the projection mapping function and based on the following light power formula:

$$\begin{cases} r'(x, y) = \underset{(x,y) \in PS_{max}}{\mathrm{argmin}} \left( \sum \left| f\left( \sum_{i=1}^{n} T_n[r'_n(x, y)] \right) - \bar{f} \right| - \bar{f} + \sum_{i=1}^{n} sm(r'(x, y)) \right) \\ f\left( \sum_{i=1}^{n} T_n[r'_n(x, y)] \right) = \begin{cases} T_n[r'_n(x, y)], & (x, y) \in S_n \\ \sum_{i=1}^{n} T_n[r'_n(x, y)], & (x, y) \in S_3 \end{cases} \\ \bar{f} = \frac{1}{N_{s_{max}}} \sum_{(x,y) \in PS_{max}} f\left( \sum_{i=1}^{n} T_n[r'_n(x, y)] \right) \\ sm(r'(x, y)) = \sum_{(x,y) \in PS_{max}} \left( \left| \frac{dr'(x, y)}{dx} \right| + \left| \frac{dr'(x, y)}{dy} \right| \right) \end{cases}$$

wherein $f(T_1, T_2)$ denotes an arrangement of the projections, $S_n$ denotes a portion of each projector that does not overlap with other projectors, $S_m$ denotes the overlap between the projectors, as the number of projectors is multiplied, $\bar{f}$ denotes an optimized output power for the whole output plane of a single light source, and $sm(r(x, y))$ denotes a restriction factor for guaranteeing smooth transition of gray level of the picture.

* * * * *